United States Patent [19]
Quinlan et al.

[11] 3,852,845
[45] Dec. 10, 1974

[54] WIPER ARM ADAPTER FOR CONVERTING A SINGLE WIPER ARM TO AN ARTICULATING WIPER ARM

[75] Inventors: William J. Quinlan; Laurence L. Huver, both of Hastings, Mich.

[73] Assignee: Hastings Manufacturing Company, Hastings, Mich.

[22] Filed: June 13, 1973

[21] Appl. No.: 369,485

[52] U.S. Cl.......... 15/250.23, 15/250.32, 15/250.35
[51] Int. Cl............................. B60s 1/40, B60s 1/32
[58] Field of Search....... 15/250.14, 250.21, 250.23, 15/250.32, 250.34, 250.35

[56] References Cited
UNITED STATES PATENTS

| | | | |
|---|---|---|---|
| 2,642,612 | 6/1953 | Smulski............................ | 15/250.23 |
| 3,035,296 | 5/1962 | Deibel............................. | 15/250.23 |
| 3,418,678 | 12/1968 | Deibel et al. .................... | 15/250.23 |

*Primary Examiner*—Peter Feldman

[57] ABSTRACT

A wiper arm adapter for converting a single lever windshield wiper arm to an articulating windshield wiper arm includes a secondary arm, a short attachment bar, a primary wiper arm interlocking clip connector secured to one end of the attachment bar, and a plastic pivot head portion or pivot block in which one end of a wiper blade mounting side pin is anchored. The plastic head or pivot block comprises a solid body portion for anchoring the side pin and a pair of overlying, coextensive parallel wings which are integrally formed with the solid body portion. The wings are separated by a coextensive slot in which single ends of the attachment bar and secondary arm are received and are pivotally mounted by parallel pivots to pivot in a common plane. In use the connector clip is slid over the end of the primary wiper arm and interlocked therewith and the free end of the secondary arm opposite the plastic head portion is pivotally mounted on a parallel axis to the primary wiper arm drive shaft so that the secondary arm causes compound oscillating movement of the pivot head as the primary wiper arm is oscillated.

13 Claims, 8 Drawing Figures

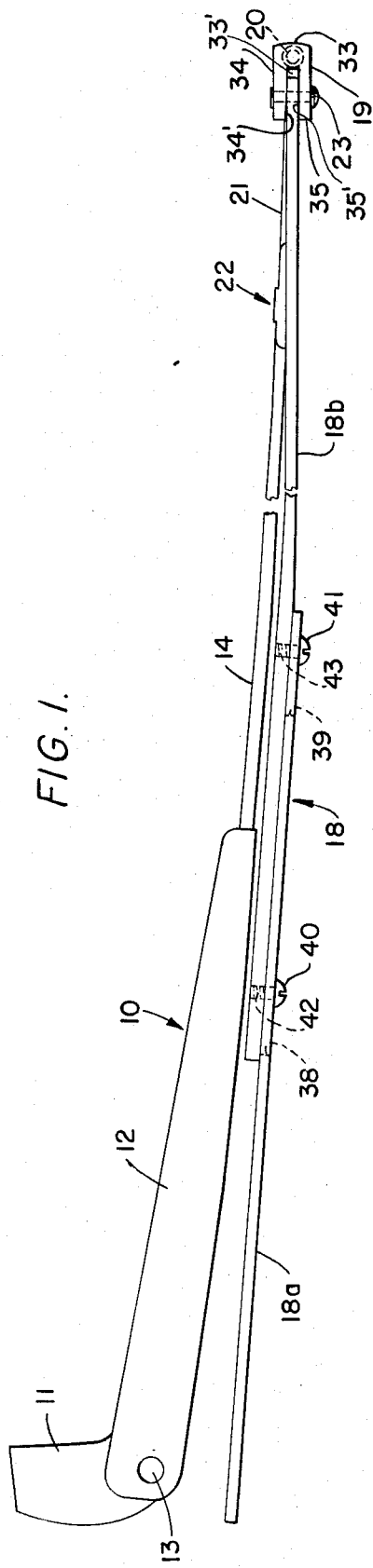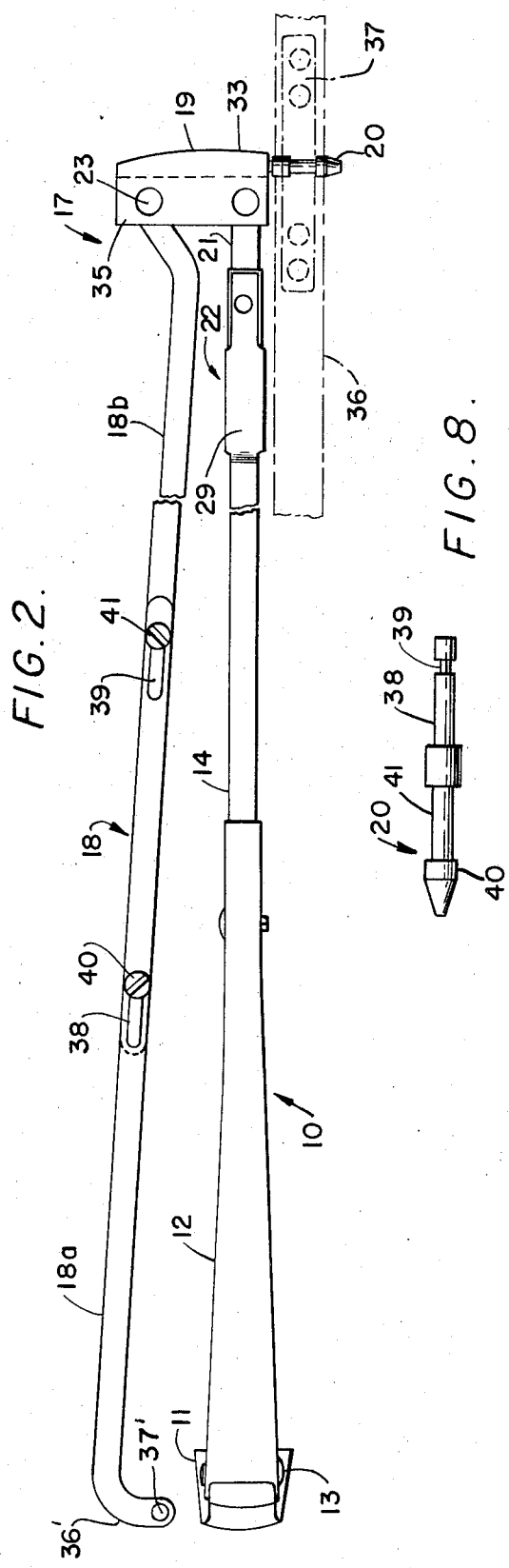

WIPER ARM ADAPTER FOR CONVERTING A SINGLE WIPER ARM TO AN ARTICULATING WIPER ARM This invention relates to a wiper arm adapter for converting a conventional single lever wiper arm to an articulating type wiper arm assembly, and also relates to the resultant articulating wiper arm assembly.

PRIOR ART

The following U.S. Pat. Nos. are listed as representative of the prior art:
2,642,612 Smulski June 23, 1953, 3,418,678 R. A. Deible et al. Dec. 31, 1968, 3,428,995 Pollock Feb. 25, 1969, 3,717,900 Quinlan et al. Feb. 27, 1973.

BACKGROUND OF THE INVENTION

Many of the older motor vehicles still in use at the present time are provided with windshield wipers that have a single wiper arm to which a wiper blade is attached by appropriate clip means.

With the advent of the "wrap around" windshields which are compoundly curved, motor vehicles have more recently been provided with articulating windshield wipers of the side pin type which include a primary and secondary wiper arm. The primary wiper arm is connected at one end to an oscillating drive shaft and at its other end to a pivot head, the secondary wiper arm, or drag link, is pivotally connected at one end to a fixed pivot positioned adjacent to and parallel to the drive shaft and is connected at the other end to the same pivot head to which the primary wiper arm is connected. A side pin mounted on the common pivot head provides a pivotal support for a side pin engaging type wiper blade. The articulating type wiper arm assembly thus permits the wiper blade to pivot about the side pin and adjust to the different curvatures of the windshield, and also imparts to the blade a compound oscillating movement across the windshield.

The aforesaid U.S. Pat. No. 3,418,678 is representative of one articulating type windshield wiper arm and side pin engaging blade assembly.

The aforesaid U.S. Pat. No. 3,717,900 illustrates particularly in FIGS. 1–3 and 11a wiper blades for use with a conventional single lever wiper arm, and illustrates in FIGS. 12–15 a wiper blade of the side pin engaging type suitable for use with the present invention.

It is an object of the present invention to provide an adapter for converting a single lever wiper arm to an articulating wiper arm having a side pin for attachment to a side pin engaging type wiper blade. The adapter of the present invention will enable a dealer or filling station operator to decrease inventory since the delaer will not have to stock both the conventional single lever arms and the newer articulating type arms as is the current practice.

Another object of the invention is the provision of an improved pivot head portion or pivot block connecting the primary wiper arm and the secondary wiper arm. On some current articulating arms, the side pin is inserted in a metal base with two pivot points, one for the primary wiper arm and the other for the secondary or articulating arm. The wear factor between the metal arm surfaces and the metal head is excessive. This causes a bind and will not allow the wiper blade to travel smoothly through the wiping pattern.

The head portion of this improved wiper unit is molded from a plastic synthetic resin or other like plastic material with a side pin encapsulated within the plastic for anchorage. Upper and lower overlying parallel wing portions of the head are separated by a coextensive covered opening for receiving one end of a secondary arm and one end of an attachment bar coplanar, pivotal relationship. Parallel rivets are used to fasten the head portion to the secondary arm and to the attachment bar. A bayonet clip is provided on the free end of the attachment bar for engagement with the bar end of a conventional single lever wiper arm.

It is another object of the invention to provide a secondary arm with adjustable means for lengthening and shortening the secondary arm to match the length of primary wiper arms which conventionally are adjustable in length.

With the foregoing objects and features in view and such other objects and features which may become apparent as the specification proceeds, the invention will be understood from the following description taken in conjunction with the accompanying drawings, wherein like characters of reference designate like parts and wherein:

FIG. 1 is a side elevational view of the wiper arm assembly of the invention;

FIG. 2 is a top plan view of the wiper arm assembly of the invention;

FIG. 8 is an enlarged side eleational view of the side pin used with this invention.

Figure 3:
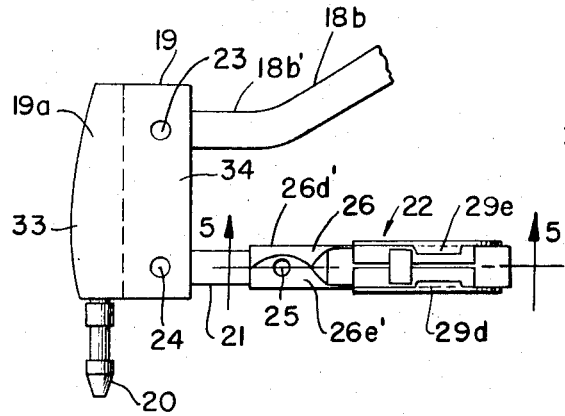
FIG. 3 is a fragmentary plan view of the wiper arm adapter portion shown in FIG. 2 with the wiper arm swung 180 degrees out of the plane of the drawing of FIG. 2 about its left hand end omitting the primary wiper arm.
Figure 4:
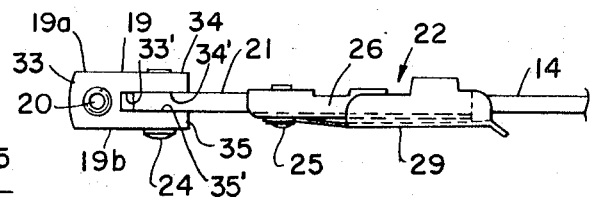
FIG. 4 is a fragmentary side elevational view of the wiper arm adapter portion shown in FIG. 3 with the primary wiper arm engaged.
Figure 5:
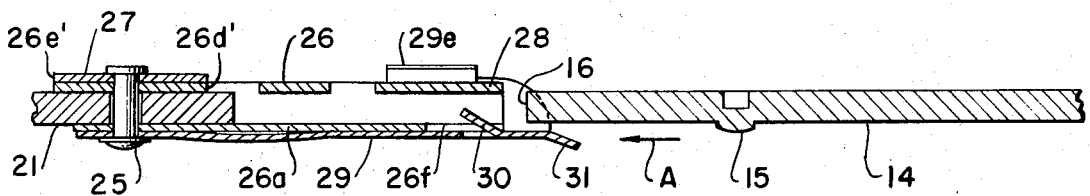
FIG. 5 is a vertical cross sectional view taken on line 5—5 of FIG. 3 of the primary wiper arm and bayonet clip disengaged.
Figure 6:
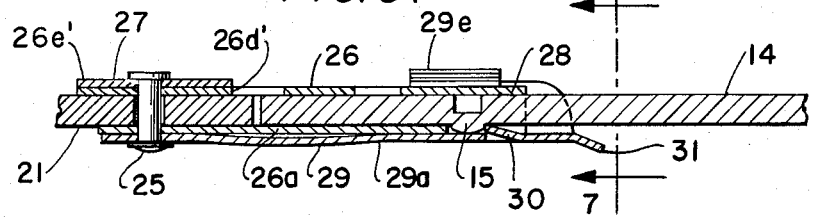
FIG. 6 is a fragmentary vertical cross sectional view of the primary wiper arm and bayonet clip engaged.

With reference now to the drawings and specifically to FIGS. 1 and 2, a conventional single lever wiper arm is designated at 10. It includes a mounting socket portion 11 adapted to engage a drive shaft (not shown), a spring chamber portion 12 pivotally connected at one end to the mounting socket portion 11 by a pivot pin 13, and connected at its other end to a flat rectangular cross sectional bar portion 14. The end of the bar portion 14 opposite the spring chamber portion 12, as illustrated in FIGS. 5 and 6, has a raised bayonet lug 15 spaced inwardly from its free end 16. The free end 16 is normally adapted to be received in a cooperating connector member pivotally mounted on the back of a wiper blade in the manner disclosed in FIGS. 1, 2, 3 and 10a of U.S. Pat. No. 3,717,900 issued Feb. 27, 1973.

The present invention however, includes an adaptor means 17 for cooperation with the wiper arm 10, hereafter to be referred to as a primary wiper arm, to provide an articulated, compound oscillating wiper arm assembly for side pin support of a wiper blade.

The adapter means 17 includes a secondary arm 18, a molded plastic head portion or pivot block 19 connected to the secondary arm 18 by a rivet 23, a side pin 20 having one end encapsulated in the molded plastic head portion 19, an attachment bar 21 pivotally connected at one end to the head 19 by a rivet 24, and a bayonet clip 22 connected to the other end of the attachment bar by a rivet 25.

Figure 7:
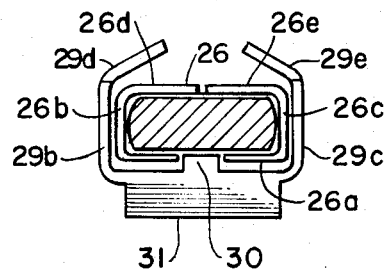
FIg. 7 is a vertical cross sectional view taken on line 7—7 of FIG. 6.

The bayonet clip 22 is basically similar to the bayonet clip shown in FIGS. 1, 2, 3 and 11 of the aforesaid U.S. Pat. No. 3,717,900; however, in this instance it is modified for connection to the attachment bar 21 rather than to a wiper blade unit as in the aforesaid patent. The bayonet clip 22 comprises a tubular, open ended, rectangularly cross sectional receptacle 26 and a channel shaped overlay leaf spring 29 secured to the receptacle 26 by the rivet 25. The receptacle 26 is formed from sheet metal by bending a flat blank into a rectangular tube having a continuous web portion 26a, opposite side walls 26b and 26c, and extensions 26d, 26e of the side walls which are turned inwardly so that they come together and form the receptacle wall opposite the web 26a. At one end 27 of the receptacle 26 which is telescoped over the free end of attachment bar 21, the inturned side wall extensions 26d and 26e overlap and are secured together by a rivet 25 which extends through apertures provided in the leaf spring 29, the receptacle 26 and the attachment bar 21. At the other end 28 of the receptacle which is adapted to receive the primary wiper arm portion 14, the extensions 26d and 26e lie in a common plane and abut each other along a medial line as seen in FIG. 7. A slot 26f is cut into the web 26a from the free end 28 to permit passage of a detent tab 30 as shown in FIG. 5. The leaf spring 29 comprises a web portion 29a, overlying the receptacle web 26a, a pair of opposite side walls 29b and 29c extending parallel to the receptacle side walls 26b and 26c, and inturned extensions 29d and 29e of the side walls 29b and 29c which are spaced from and overlie the receptacle side wall extensions 26d and 26e. A detent tab 30 is integrally formed from the leaf spring by cutting parallel slits in the web 26a at a position inward from the end 28, and a transverse slit across the parallel slits to define the end of the tab and bending the tab inwardly so that the tab slants inwardly into the receptacle 26 from the open end 28. A finger piece 31 is provided on the free end of the spring which slants away from the receptacle in a direction opposite to the detent tab 30. In use, the end 16 of the primary wiper arm portion 14 is inserted into the open end 28 of the receptacle 26 in the direction of the arrow A shown in FIG. 5 until the bayonet lug 15 is seated in front of the detent 30 as shown in FIG. 6. Upon insertion of the primary wiper arm 14, the leaf spring 29 is forced away from the web 26a by contact of the wiper arm 14 with the detent tab 30 but once the lug 15 has passed inwardly beyond the detent tab 30, the bias of the leaf spring 29 seats the detent 30 behind the lug 15 so that the wiper arm cannot be withdrawn until the leaf spring 29 is manually moved away from the receptacle web 26a. When the arm 14 is to be removed from the receptacle 26 the leaf spring 29 is grasped by its finger piece 31 and moved away from the web 26a in order to disengage the detent 30 from the bayonet lug 15 on the wiper arm 14 and to permit the arm to be slid out of the receptacle. The inturned extensions 29d and 29e serve as stops to limit the extent to which the spring 29 may be moved away from the web 26a by the finger piece 31.

The head portion or pivot block 19 on the wiper arm adapter is molded from a synthetic resin or other plastic type material which in the cured state is a rigid body comprising an elongated solid body portion 33 in which the side pin 20 is anchored and projects from one end in the longitudinal direction thereof, and a pair of parallel overlying rectangularly shaped wings 34 and 35 which are separated by a coextensive rectangular slot 33' in which the end 18b of the secondary wiper arm 18 and an end of the attachment bar 21 are received and are secured by rivets 23 and 24 respectively for pivotal motion in a common plane. The wings 34 and 35 project from the solid body portion 33 in a direction which is approximately 90° from the axis of the side pin 20. The head portion or pivot block 19 is a flat low profile block having flat parallel upper and lower surfaces 19a and 19b respectively which extend over the entire block. The inner surfaces 34' and 35' of the wings 34 and 35 respectively are also flat and parallel to provide smooth bearing surfaces for the attachment bar 21 and the secondary arm end section 18b. The end 18b' of the secondary arm section 18b is bent outwardly from the longitudinal axis of the arm section by approximately 35°.

The secondary arm 18 of the wiper arm adapter includes a pair of sections 18a, and 18b which are longitudinally adjustable relative to each other to provide means for lengthening and shortening the arm to match the adjustable arm bars in the conventional adjustable single lever wiper arm assemblies. The section 18a is provided with spaced elongated slots 38 and 39 in which headed screws 40 and 41 slide. The threaded ends of screws 40 and 41 are received in longitudinally spaced internally threaded bores 42, 43 in the section 18b, and by tightening or loosening the screws in the bores the section 18b may be made rigid relative to the section 18a or may be adjusted in length within the limits of the slots 38, 39. The end of the secondary wiper arm section 18a, remote from the section 18b, includes a laterally offset portion 36' which is provided with a circular aperture 37'. The aperture 37' is adapted to receive a pivot pin (not shown) whose axis is suitably spaced from and parallel to a drive shaft which drives the primary wiper arm 10 in a manner well known in the art.

An enlarged view of the side pin 20 is shown in FIG. 8. The right hand end 38 of the side pin as seen in FIG. 8 is provided with an annular groove 39, which when the plastic head 19 is molded around the end 38, forms an interlock with the plastic head once the head has cured, to retain the pin in the head. The side pin 20 is adapted to be received in a side pin connector 37 mounted on a wiper blade 36 as indicated by phantom lines in FIG. 2. The left hand portion of the side pin 20 is provided with a conically pointed head portion 40 behind which is an annular groove 41 which receives a retaining spring (not shown) provided on the side pin connector 37 to engage the pin behind the head 40 and lock the side pin in the connector 37. The manner of engagement of the side pin 20 by the connector 37 is illustrated in FIGS. 13, 14, and 15 of the aforesaid U.S. Pat. No. 3,717,900.

From the foregoing description it will be apparent that a conventional single lever wiper arm 10 may be converted by means of the wiper arm adapter 17 of this invention to an articulated, compound wiper arm assembly by sliding the bayonet clip 22 over the end 16 of the bar portion 14 of the single lever wiper arm 10.

While in the foregoing there have been described and shown the preferred embodiments of the invention, various modifications and equivalents may be resorted to within the spirit and scope of the invention as claimed.

What is claimed is:

1. A windshield wiper arm adapter for converting a single lever oscillating wiper arm having a driven end and a free end to a compound articulating wiper arm assembly comprising a pivot block, a windshield wiper blade mounting pin anchored in said pivot block, an elongated secondary wiper arm having one end pivotally connected to said pivot block and a second end provided with bearing means for pivotal mounting with respect to a fixed pivot, a detachable connector means for interlocking engagement with the free end of said single lever wiper arm and for manually actuated disengagement therefrom, and means for pivotally connecting said detachable connector means to said pivot block.

2. The windshield wiper arm adapter as defined in claim 1 wherein the pivot block is molded from plastic type material.

3. The windshield wiper arm adapter according to claim 1 wherein said secondary arm includes means for adjusting its length.

4. The windshield wiper arm adapter according to claim 1 wherein said detachable connector means includes an elongated tubular receptacle having one end pivotally connected to said pivot block and an open end for slidably receiving the free end of said single lever wiper arm, and a spring clip secured to said receptacle and provided with detent means for interlockingly engaging the free end of said single lever wiper arm to retain said free end within said receptacle, and with finger engaging means for disengaging said spring clip from said single lever arm to release same.

5. A windshield wiper arm adapter for converting a single lever oscillating wiper arm having a driven end and a free end to a compound articulating wiper arm assembly comprising a pivot block, a windshield wiper blade mounting pin anchored in said pivot block, an elongated secondary wiper arm having one end pivotally connected to said pivot block and a second end provided with bearing means for pivotal mounting with respect to a fixed pivot, a detachable connector means for interlocking engagement with the free end of said single lever wiper arm and for manually actuated disengagement therefrom, and means for pivotally connecting said detachable connector means to said pivot block, said detachable connector means including an elongated tubular receptacle having one end pivotally connected to said pivot block and an open end for slidably receiving the free end of said single lever wiper arm, and a spring clip secured to said receptacle and provided with detent means for interlockingly engaging the free end of said single lever wiper arm to retain said free end within said receptacle, and with finger engaging means for disengaging said spring clip from said single lever arm to release same, said means for pivotally connecting said detachable connector means to said pivot including an attachment bar having one end secured in said one end of said tubular receptacle and its other end pivotally connected to said pivot block.

6. The windshield wiper arm according to claim 5 wherein said pivot block includes an elongated solid body portion in which said mounting pin is anchored and extends in the longitudinal direction of said solid body portion; a pair of overlying parallel wings projecting from said solid body portion in a direction approximately at right angles to said mounting pin, an elongated slot formed in said pivot block between said pair of wings in which one end of said secondary arm and said other end of said attachment bar are received in coplanar relationship, and spaced parallel rivets extending through said wings pivotally securing said one end of said secondary arm and said other end of said attachment bar within said slot.

7. A windshield wiper arm adapter for converting a single lever oscillating wiper arm having a driven end and a free end to a compound articulating wiper arm assembly comprising a pivot block, a windshield wiper blade mounting pin anchored in said pivot block, an elongated secondary wiper arm having one end pivotally connected to said pivot block and a second end provided with bearing means for pivotal mounting with respect to a fixed pivot, a detachable connector means for interlocking engagement with the free end of said single lever wiper arm and for manually actuated disengagement therefrom, and means for pivotally connecting said detachable connector means to said pivot block, said pivot block including an elongated solid body portion in which said mounting pin is anchored and extends in the longitudinal direction of said solid body portion; a pair of overlying parallel wings projecting from said solid body portion in a direction approximately at right angles to said mounting pin, an elongated slot formed in said pivot block between said pair of wings in which one end of said secondary arm and said detachable connector means are received in coplanar relationship, and spaced parallel rivets extending through said wings pivotally securing said one end of said secondary arm and said detachable connector means within said slot.

8. A compound windshield wiper arm assembly comprising in combination a primary wiper arm having at one end a mounting socket portion for driven engagement with an oscillating wiper arm drive shaft, and having at its other end a bar like portion normally for detachable connection to a windshield wiper blade unit, and an adaptor means for converting said primary arm to a compound articulating windshield wiper arm assembly, said adapter means comprising a low profile pivot block, a windshield wiper blade mounting pin anchored in said pivot block, an elongated secondary wiper arm having one end pivotally connected to said pivot block and a second end provided with bearing means for pivotal mounting with respect to a fixed pivot, a detachable connector means interlockingly engaging the bar like portion of said primary wiper arm and means pivotally connecting said detachable connector means to said pivot block.

9. The windshield wiper arm adapter according to claim 8 wherein said secondary arm includes means for adjusting its length.

10. The windshield wiper arm adapter according to claim 8 wherein said detachable connector means includes an elongated tubular receptacle having one end pivotally connected to said pivot block and an open end slidably receiving the bar like end portion of said primary wiper arm, and a spring clip secured to said receptacle and provided with detent means interlockingly engaging said bar like end portion to retain said bar like end within said receptacle, and with finger engaging means for disengaging said spring clip from said bar like end portion to release same.

11. A compound windshield wiper arm assembly comprising in combination a primary wiper arm having at one end a mounting socket portion for driven engagement with an oscillating wiper arm drive shaft, and having at its other end a bar like portion normally for detachable connection to a windshield wiper blade unit, and an adapter means for converting said primary arm to a compound articulating windshield wiper arm assembly, said adapter means comprising a low profile pivot block, a windshield wiper blade mounting pin anchored in said pivot block, an elongated secondary wiper arm having one end pivotally connected to said pivot block and a second end provided with bearing means for pivotal mounting with respect to a fixed pivot, a detachable connector means interlockingly engaging the bar like portion of said primary wiper arm and means pivotally connecting said detachable connector means to said pivot block, said detachable connector means including an elongated tubular receptacle having one end pivotally connected to said pivot block and an open end slidably receiving the bar like end portion of said primary wiper arm, and a spring clip secured to said receptacle and provided with detent means interlockingly engaging said bar like end portion to retain said bar like end within said receptacle, and with finger engaging means for disengaging said spring clip from said bar like end portion to release same, said means for pivotally connecting said detachable connector means to said pivot including an attachment bar having one end secured in said one end of said tubular receptacle and its other end pivotally connected to said pivot block.

12. A compound windshield wiper arm assembly as defined in claim 11 wherein the pivot block is molded from plastic type material.

13. A compound windshield wiper arm assembly comprising in combination a primary wiper arm having at one end a mounting socket portion for driven engagement with an oscillating wiper arm drive shaft, and having at its other end a bar like portion normally for detachable connection to a windshield wiper blade unit, and an adapter means for converting said primary arm to a compound articulating windshield wiper arm assembly, said adapter means comprising a low profile pivot block, a windshield wiper blade mounting pin anchored in said pivot block, an elongated secondary wiper arm having one end pivotally connected to said pivot block and a second end provided with bearing means for pivotal mounting with respect to a fixed pivot, a detachable connector means interlockingly engaging the bar like portion of said primary wiper arm and means pivotally connecting said detachable connector means to said pivot block, said pivot block including an elongated solid body portion in which said mounting pin is anchored and extends in the longitudinal direction of said solid body portion; a pair of overlying parallel wings projecting from said solid body portion in a direction approximately at right angles to said mounting pin, an elongated slot formed in said pivot block between said pair of wings in which one end of said secondary arm and said detachable connector means are received in coplanar relationship, and spaced parallel rivets extending through said wings pivotally securing said one end of said secondary arm and said detachable connector means within said slot.

* * * * *